Patented Feb. 9, 1943

2,310,523

UNITED STATES PATENT OFFICE 2,310,523

PROCESS FOR THE PRODUCTION OF DIOLEFINS

Herbert P. A. Groll, Hamburg-Wellingsbuttel, Germany, and George W. Hearne and George E. G. von Stietz, Berkeley, Calif., assignors to Shell Development Company, San Francisco, Calif., a corporation of Delaware No Drawing. Application December 19, 1938, Serial No. 246,666

19 Claims. (Cl. 260—680)

The present invention relates to a process for the production of diolefins and halogen acid by non-catalytic dehydrohalogenation of dihaloparaffins.

Aliphatic diolefins, as is well known, may, in general, be readily polymerized to form rubberlike products which are capable of being vulcanized and worked like natural rubber and exhibit desirable properties which in many respects are superior to those of natural rubber. Because of their superiority in certain respects to the natural product, various synthetic rubbers have been and are commercially produced on a small scale in spite of their much higher cost. The chief difficulty preventing the more widespread production and use of these more desirable synthetic products has been the lack of a cheap source of suitable diolefins.

In view of the ready availability and low cost of various dihaloparaffins, these materials have long been looked upon as the most logical raw material from which to prepare a cheap and plentiful supply of diolefins. With this object in mind a large amount of work has been done on various methods of dehydrohalogenating these compounds to the corresponding diolefins, and several processes and modifications have been proposed. These proposed processes differ considerably and may be grouped into three distinct classes, namely chemical removal of halogen acid by means of basic agents, catalytic dehydrohalogenation under acid conditions, and pyrolysis in the presence of steam.

Various processes involving the removal of halogen acid by means of basic agents have been proposed. These processes have the disadvantages of consuming considerable quantities of reagents, of precluding the recovery of the halogen acid, and of giving low yields of diolefins.

Processes of the second class involving catalytic dehydrohalogenation overcome to a certain extent the main disadvantages of the chemical dehydrohalogenation by means of basic agents since they avoid the consumption of the basic reagent and permit the recovery of the halogen acid. It has invariably been found, however, that in catalytic dehydrohalogenation considerable polymerization to tars and decomposition to coke occurs. As a consequence the catalysts rapidly deteriorate, even at the lowest operative temperatures, and must be frequently replaced or rejuvenated.

It has also been proposed to execute the dehydrohalogenation at higher temperatures in the absence of a catalyst in which case, in order to avoid the decomposition to tars and carbon and to assist in the reaction, a substantial quantity of steam is used. This process, although overcoming most of the difficulties of the other type processes, leaves much to be desired. In order for a dehydrohalogenation process to be economically practical it is necessary that the valuable halogen acid may be recovered in usable form. In the pyrolytic process with steam, for example, the halogen acid can, at best, be recovered as a dilute aqueous solution of very little value. The process, moreover, has other disadvantages such as, for example, the corrosion difficulties caused by the hot mixture of halogen acid and water vapors.

In view of their several disadvantages the proposed processes for the production of diolefins by dehydrohalogenation have, in general, proven to be too uneconomical for commercial use. Butadiene, for example, is produced in the United States chiefly by the cracking of petroleum hydrocarbons, in Germany chiefly by synthesis from acetlyene through acetaldehyde, acetaldol and butylene glycol, and in Russia chiefly by synthesis from ethanol and acetaldehyde.

We have found that by entirely disregarding the teachings of the art and by executing the dehydrohalogenation non-catalytically in the substantial absence of water at quite elevated temperatures the difficulties due to the polymerization of the diolefin and the formation of tar and coke are not increased as would be expected, but are, on the contrary, diminished. We have found that the dehydrohalogenation of dihaloparaffins may be executed non-catalytically in the substantial absence of water, and that these conditions, other variables being favorably adjusted, are not only most favorable for the best yields of diolefin, but also allow a simpler and far more practical process than any hitherto disclosed.

An object of our invention is to provide a more simple, practical and economical process for the production of diolefins and in particular butadiene. More particular objects are to provide a method for the production of diolefins by dehydrohalogenation which allows better yields to be obtained from inexpensive and available halogen compounds, which allows the recovery of the halogen acid from the reaction product in the anhydrous form or in the form of solutions of high concentration, which is substantially free from difficulties due to coke and tar formation and which does not require the use of catalysts, alkalies, steam, or other reagents.

The present process in its most simple aspect consists in continuously passing the vapors of the appropriate halogen-compound in the substantial absence of water through a non-catalytic reaction chamber maintained at a suitable temperature, and separately recovering the diolefin and halogen acid from the effluent vapors.

The process may be executed in conventional apparatus of widely varying design. One convenient method of executing the process which, in view of its simplicity is exceptionally suitable for large scale commercial production, consists in vaporizing the halide either in a separate vaporizer or in the fore section of the reaction tube, passing the vapors continuously through an unpacked tube maintained at the desired temperature, and recovering the diolefin and halogen acid therefrom. The following example serves to illustrate this method of executing the dehydrohalogenation.

*Example I*

155.5 lbs. of 2,3-dichlorbutane was pumped at a constant rate of 20 lbs. per hour through a ⅜ inch steam jacketed coil wherein it was completely vaporized. The vapors then passed through a six foot length of 2 inch (internal diameter) brass pipe provided with an external steel sleeve and maintained at a temperature of about 649° C. by means of a gas fired furnace. The effluent vapors were cooled and the unreacted 2,3-dichlorbutane, butadiene and hydrochloric acid separately recovered therefrom. The unreacted 2,3-dichlorbutane (34%) was stored for reuse. The following yields were obtained:

| | Percent |
|---|---|
| Yield of butadiene | 68.9 |
| Yield of unsaturated monochloride | 24.8 |
| Losses, including polymerization products | 6.3 |

Although the apparatus may, in general, be fabricated from most any material capable of withstanding vapors of the halogen acids and the high temperatures employed, reaction tubes of certain materials are more suitable than others. We have found reaction tubes of quartz, brass, bronze, ceramic material and carbon to be, in general, especially suitable. Reaction tubes fabricated from ferrous metals, although applicable, tend, in general, to give lower yields and to promote the production of loose, finely divided carbon, particularly at either end of the heated portion of the tube. The results of comparable experiments using unpacked brass, stainless steel (KA₂) and quartz tubes are shown in the following Table I.

TABLE I

| | Example | | |
|---|---|---|---|
| | II | III | IV |
| Tube material | Brass | KA₂ steel | Quartz. |
| Temperature (inside of tube) | 638° C | 646° C | 670–700° C. |
| Raw material | 2, 3-dichlor-butane. | Same | Same. |
| Conversion | 93.8% | 94.8% | 94.3%. |
| Yield of butadiene | 71.8% | 64.4% | 74.5%. |
| Yield of unsaturated monochlorides | 18.3% | 15.8% | 12.8%. |
| Yield of polymerization products | 4.5% | 8.4% | 2.2%. |
| Losses | 5.2% | 11.4% | 10.5%. |

Although the process is preferably carried out with unpacked tubes, reaction tubes filled or partly filled with a suitable packing material may also be employed. The use of packed tubes may, in certain cases be of some advantage in aiding the heat transfer, and offering a larger surface upon which the reaction may occur. Care must be exercised, however, in selecting a suitable packing material since any material tending to catalyse the dehydrohalogenation reaction will, at the temperatures employed, cause an excessive formation of tar and coke resulting in some cases in the plugging of the reaction tube. Carbon chips, glass wool, pumice and porcelain chips have been found to be suitable. Pertinent data and the results of two illustrative experiments using quartz tubes packed with pumice and with porcelain chips are given in Table II.

TABLE II

| | Example | |
|---|---|---|
| | V | VI |
| Tube material | Quartz | Quartz. |
| Packing material | Pumice | Porcelain chips. |
| Raw material | 2, 3-dichlorbutane | Same. |
| Temperature (inside of tube) | 590° C | 570° C. |
| Conversion | 84% | 75.2%. |
| Yield of butadiene | 72.6% | 75.4%. |
| Yield of unsaturated monochlorides | 17.5% | 7.4%. |
| Polymerization products and losses | 9.8% | 17.2% |

The present process is generally applicable to the production of diolefins from such dihaloparaffins as contain two halogen atoms substituted into a nuclear hydrocarbon chain consisting of four non-quaternary carbon atoms. Of these available dihalo compounds the dichlorides are preferred. These compounds may consist of the various isomers of the nuclear groups itself, for example, 1,2-dichlorobutane, 2,3-dichlorobutane, 1,3-dichlorobutane and 1,4-dichlorobutane, or may contain one or two alkyl groups attached to one or both of the terminal carbon atoms, for example 1,2-dichloropentane, 2,3-dichloropentane, 2,3-dichloro-2-methyl-pentane, 2,4 - dichloro - 2 - methyl-pentane, 1,2 - dichlorohexane, 2,4-dichlorohexane, 2,4-dichloro-2,5-dimethylhexane, etc. An alkyl group may also be attached to one or both of the intermediate carbon atoms of the nuclear chain of four non-quaternary carbon atoms, for example 2,3-dichloro-2-methyl butane, 2,4-dichloro-2-methyl butane, 1,4-dichloro-2,3-dimethyl-butane, 1,3-dichloro-2-ethyl-butane, etc.

Many of these dichloroparaffins may be prepared in any desired quantities from the olefins by halogen addition. Excellent yield of butadiene may be obtained, for example, from the crude mixture of 1,2- and 2,3-dichloro-butanes obtained by the direct chlorination of the overabundant mixture of butene-1 and butene-2. If the mixture of butylenes is chlorinated at certain temperatures a mixture of 1,2- and 2,3-dichlorobutanes containing considerable quantities of unsaturated monochlorides is obtained. This mixture likewise constitutes an excellent starting material for the process.

When the vapors of any of the above described halogen compounds are passed through the reaction tube maintained at a sufficiently high temperature dehydrohalogenation takes place to a greater or lesser extent dependent upon the severity of the prevailing conditions, i. e., the prevailing temperature and the length of time allowed for reaction. The temperature and reaction time (severity of the conditions) may therefore be most conveniently expressed in terms of the amount of dehydrohalogenation taking place. The extent to which the raw material is dehydrohalogenated (the percent of material reacted) we express as percent "conversion." Although our process may also be operated using low percent conversions we have found that relatively high conversions such as, for example, from 50 to 98% are preferable since they allow somewhat higher yields of butadiene and are more advantageous from the standpoint of economy of operation.

Since the percent conversion is dependent upon the two variables, temperature and reaction time, any given percent conversion may be maintained over a wide range of temperature by properly adjusting the reaction time, and vice versa. Thus, by properly adjusting the reaction time (throughput rate) the temperature may be varied from about 525° C. up to about 800° C. We have found that if the corresponding reaction time is adjusted to give a preferred conversion, temperatures between 560° C. and 770° C. give the highest yields of diolefin with the most economy of operation. Temperatures below about 525° C. are unsuitable since at these lower temperatures the noncatalytic dehydrohalogenation of the halogen compounds in question does not take place at a practical rate. Even at 525° C., in order to obtain a practical conversion, a relatively long reaction time (low throughput rate) must be employed, and the yields of diolefin are below those obtained under the more favorable conditions.

Aside from the diolefin and halogen acid, which constitute by far the main reaction products, there are formed in the present process small amounts of polymerization products, carbon and gaseous hydrocarbons. These latter substances are produced by side reactions which invariably take place to a minor extent. There is also formed appreciable quantities of partially dehydrohalogenated material, namely unsaturated monohalides.

The various reaction products may be recovered from the effluent reaction mixture by any of several methods. One method for recovering the various products from the reaction mixture is illustrated by the following example: The reaction mixture obtained from the dehydrohalogenation of 2,3-dichlorobutane is passed through a partial condenser to remove the unreacted 2,3-dichlorobutane. The gaseous reaction product, after separation of the unreacted 2,3-dichlorobutane, is passed through a scrubbing tower maintained at a temperature of about 0–20° C. wherein the butadiene, the unsaturated monochlorides and a small amount of gaseous impurities are absorbed in a suitable solvent, such as kerosene. It has been found that butadiene and anhydrous hydrochloric acid do not react to any appreciable extent when dissolved in kerosene to saturation (kerosene dissolves 2.42 mols per liter of butadiene and 0.09 mol per liter of anhydrous hydrochloric acid at room temperature). A small amount of gaseous impurities, a small amount of anhydrous hydrochloric acid, the butadiene and the unsaturated monochlorides are removed from the solvent by fractional distillation after which the solvent is recycled through the scrubbing tower. The last traces of hydrochloric acid vapors are removed from the otherwise pure butadiene by scrubbing with water or with a dilute alkali solution.

The unreacted 2,3-dichlorobutane recovered as above described contains a small amount of dissolved butadiene as well as a certain amount of polymerized material. This recovered 2,3-dichlorobutane may be recycled as is, if desired, in the process in which case the higher boiling polymers will gradually collect in the evaporator. Alternatively, the small amount of dissolved butadiene may be recovered and the higher boiling polymers eliminated by a fractional distillation.

The exit gas from the scrubbing tower consists of substantially pure anhydrous hydrochloric acid. Although this gas usually contains a small quantity of butadiene when it leaves the scrubbing tower the butadiene content decreases to a negligible quantity upon standing for a short time. The anhydrous hydrochloric acid which is recovered is substantially pure in a quantity approximately twice that of the butadiene, is a very valuable by-product materially enhancing the economy of the process. It is well suited, for example, for use in preparing alkyl chlorides and many other uses where aqueous solutions are unsuitable.

The unsaturated monohalides formed by partial dehydrohalogenation are predominantly of the vinyl type, i. e., the halogen atom is attached to an unsaturated carbon atom. Thus, for example, the unsaturated monochlorides recovered as above described consist predominantly of the cis and trans isomers of 2-chloro-butene-2. Since vinyl type unsaturated halides are, in general, very difficult to further dehydrohalogenate this material if recycled gives only very poor yields of diolefin and is, therefore, preferably recovered as a by-product.

In view of its many distinct advantages the present process for the production of diolefins is superior to the existing methods in several important respects. As compared to the dehydrohalogenation in the presence of steam, for example, our process has the important advantage of allowing the recovery of the halogen acid in the anhydrous state or in the form of concentrated solutions. When it is considered that there are two mols of halogen acid formed for each mol of diolefin produced and that the value of this halogen acid when recovered in a concentrated form closely approaches the value of the diolefin itself, the economic importance of this advantage of our process is at once apparent. This advantage, it should, furthermore, be pointed out, is obtained with a minimum of carbon and tar formation and with equal or superior yields of diolefin. The present process is, moreover, distinctly superior to processes involving pyrolysis with steam in respect to production capacity. According to the present process, for example, a surprisingly small furnace provided with six 6 in. x 6 ft. reaction tubes is capable of producing 1200 lbs. of butadiene per day, whereas when steam is employed the production is about one-half this quantity. Furthermore, the cost of vaporizing and condensing considerable quantities of water is eliminated. Another advantage of the present process lies in the fact that the reaction product, being substantially anhydrous, is less corrosive.

Our process is distinctly superior to catalytic dehydrohalogenation process and processes utilizing alkaline agents in that it permits the attainment of much better yields; it practically avoids the formation of coke and tar and therefore eliminates the frequent cleaning and recharging of reaction tubes; and it eliminates the cost of catalysts, alkalies and catalyst rejuvenation.

The terms "thermal dehydrochlorination" and "thermal dehydrohalogenation," as employed herein and in the appended claims, refer respectively to dehydrochlorinations and dehydrohalogenations which are effected thermally and in the absence of any catalyst and of a basic agent.

We claim as our invention:

1. A process for the production of butadiene from 2,3-dichlorbutane which comprises subjecting substantially anhydrous vapors of the dichlorbutane to thermal dehydrohalogenation at a temperature in the range of from 560° C. to 770° C. in an unpacked reaction vessel, and recovering butadiene and anhydrous hydrochloric acid from the resulting mixture.

2. A process for the production of butadiene from 2,3-dichlorbutane which comprises subjecting substantially anhydrous vapors of the dichlorbutane to thermal dehydrohalogenation at a temperature in the range of from 560° C. to 770° C. in an unpacked reaction vessel, and recovering butadiene from the resulting mixture.

3. A process for the production of butadiene from 2,3-dichlorbutane which comprises subjecting substantially anhydrous vapors of the dichlorbutane to thermal dehydrohalogenation at a temperature in the range of from 560° C. to 770° C., and recovering butadiene from the reresultant mixture.

4. A process for the production of butadiene from a normal dichlorbutane which comprises subjecting the substantially anhydrous vapors of the dichlorbutane to thermal dehydrohalogenation at a temperature in the range of from 560° C. to 770° C., and recovering butadiene from the resultant mixture.

5. A process for the production of butadiene from a normal dihalobutane which comprises subjecting the substantially anhydrous vapors of the dihalobutane to thermal dehydrohalogenation at a temperature in the range of from 525° C. to 800° C., and recovering butadiene from the resultant mixture.

6. A process for the production of butadiene from a normal dihalobutane which comprises, subjecting the substantially anhydrous vapors of the dihalobutane to thermal dehydrohalogenation at a temperature in the range of from 560° C. to 770° C., and recovering butadiene and anhydrous halogen acid from the resultant mixture.

7. A process for the production of aliphatic diolefin hydrocarbons from dihaloparaffins containing two halogen atoms substituted into a nuclear hydrocarbon chain consisting of four nonquaternary carbon atoms which comprises, subjecting the substantially anhydrous vapors of the dihaloparaffin to thermal dehydrohalogenation at a temperature in the range of from 525° C. to 800° C., and recovering an aliphatic diolefin hydrocarbon and anhydrous halogen acid from the resultant mixture.

8. A process for the production of aliphatic diolefin hydrocarbons from dihaloparaffins containing two halogen atoms substituted into a nuclear hydrocarbon chain consisting of four nonquaternary carbon atoms which comprises, subjecting the substantially anhydrous vapors of the dihaloparaffin to thermal dehydrohalogenation at a temperature in the range of from 525° C. to 800° C., and recovering an aliphatic diolefin hydrocarbon from the resultant mixture.

9. A process for the production of butadiene from a normal dichlorbutane which comprises subjecting the substantially anhydrous vapors of the dichlorbutane to thermal dehydrohalogenation at a temperature in the range from 560° C. to 700° C., and recovering butadiene from the resultant mixture.

10. A process for the production of butadiene from a normal dichlorbutane which comprises subjecting the substantially anhydrous vapors of the dichlorbutane to thermal dehydrochlorination at a temperature in the range of 560° C. to 700° C. in a reaction vessel containing a packing of inert material and obtaining butadiene thereby.

11. A process for the production of butadiene from a normal dichlorbutane which comprises subjecting substantially anhydrous vapors of the dichlorbutane to thermal dehydrochlorination at a temperature in the range of from 525° C. to 800° C., and separately recovering butadiene and anhydrous hydrochloric acid from the resultant mixture.

12. A process for the production of aliphatic diolefin hydrocarbons from dihaloparaffins containing two halogen atoms substituted into a nuclear hydrocarbon chain consisting of four nonquaternary carbon atoms, which comprises subjecting the substantially anhydrous vapors of the dihaloparaffin to thermal dehydrohalogenation at a temperature in the range of from 525° C. to 800° C., and separately recovering an aliphatic diolefin hydrocarbon and anhydrous halogen acid from the resultant mixture.

13. A process for the production of aliphatic diolefin hydrocarbons from dichlorparaffins containing two chlorine atoms substituted into a nuclear hydrocarbon chain consisting of four nonquaternary carbon atoms, which comprises subjecting the substantially anhydrous vapors of the dichlorparaffin to thermal dehydrochlorination at a temperature in the range of from 525° C. to 800° C., and recovering an aliphatic diolefin hydrocarbon from the resultant mixture.

14. A process for the production of butadiene which comprises subjecting substantially anhydrous vapors of a mixture of normal dichlorbutanes to thermal dehydrochlorination at a temperature in the range of from 525° C. to 800° C., and recovering butadiene from the resultant mixture.

15. In a process of dehydrochlorinating a normal dichlorbutane, the step of subjecting substantially anhydrous vapors of the dichlorbutane to thermal dehydrochlorination at a temperature in the range of from 560° C. to 770° C.

16. In a process of dehydrochlorinating a normal dichlorbutane, the step of subjecting substantially anhydrous vapors of the dichlorbutane to thermal dehydrochlorination at a temperature in the range of from 525° C. to 800° C.

17. The process of subjecting substantially anhydrous vapors of a dihaloparaffin containing two halogen atoms substituted into a nuclear hydrocarbon chain consisting of four non-quaternary carbon atoms to thermal dehydrohalogenation at a temperature in the range of from 525° C. to 800° C.

18. A process for the production of butadiene which comprises subjecting substantially anhydrous vapors of a normal dihalobutane to thermal dehydrohalogenation in a reaction zone maintained at a temperature in the range of from 525° C. to 800° C. thereby producing butadiene, recovering butadiene from the gaseous mixture issuing from said reaction zone, and recirculating through said reaction zone at least a portion of the unconverted material issuing therefrom.

19. A process for the production of butadiene which comprises halogenating a butylene thereby producing normal dihalobutane, subjecting said normal dihalobutane to thermal dehydrohalogenation at a temperature in the range of from 525° C. to 800° C., and recovering butadiene from the resultant mixture.

HERBERT P. A. GROLL.
GEORGE W. HEARNE.
GEORGE E. G. von STIETZ.